Feb. 12, 1935.  W. G. NOACK  1,991,114
SAFETY DEVICE FOR PRESSURE FIRED STEAM GENERATORS
Filed May 22, 1933
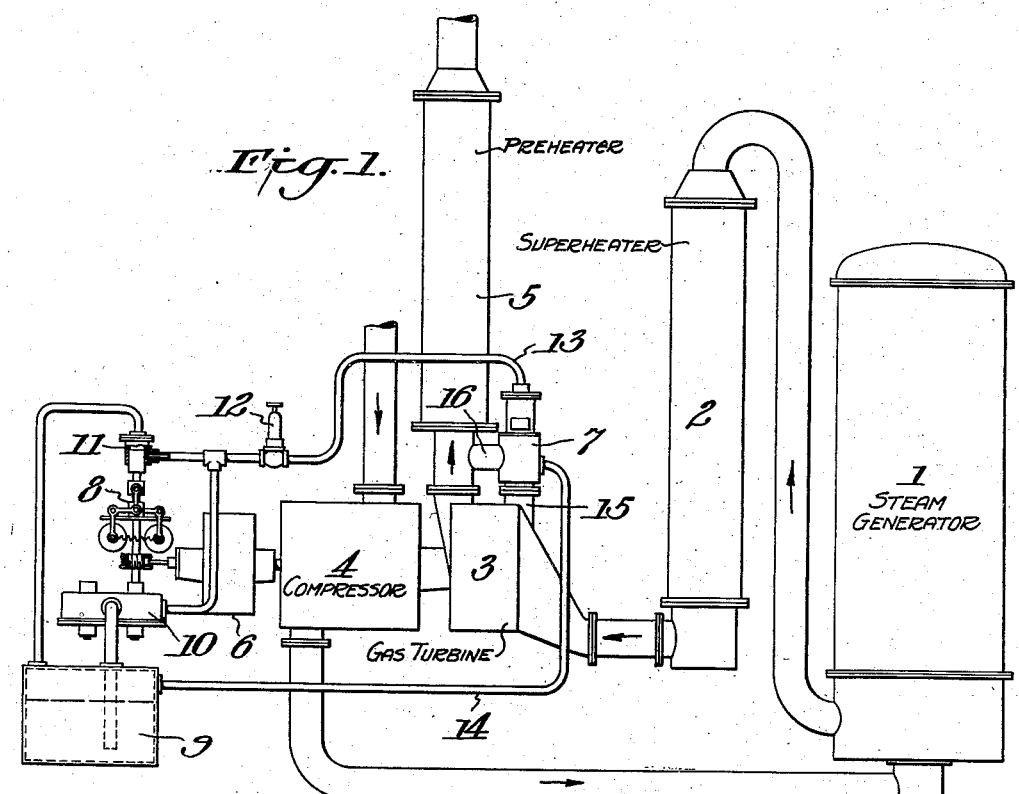
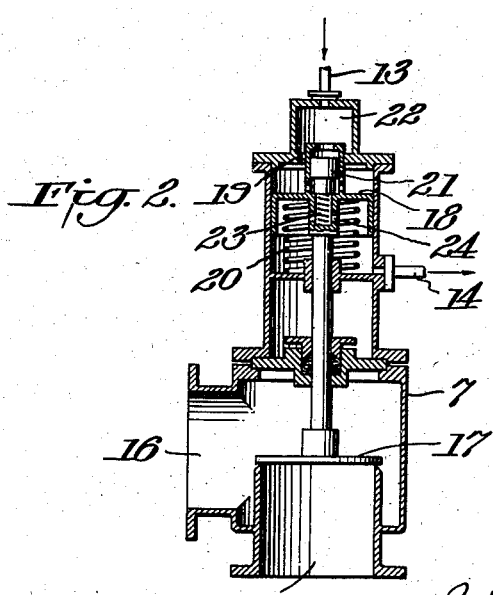
Inventor:
Walter Gustav Noack
By Potter, Pierce & Scheffler
Attorneys.

Patented Feb. 12, 1935

1,991,114

UNITED STATES PATENT OFFICE 1,991,114

SAFETY DEVICE FOR PRESSURE FIRED STEAM GENERATORS

Walter Gustav Noack, Baden, Switzerland, assignor to Aktiengesellschaft Brown Boveri & Cie., Baden, Switzerland, a joint-stock company of Switzerland Application May 22, 1933, Serial No. 672,305 In Germany May 11, 1932

6 Claims. (Cl. 122—24)

With pressure fired steam generators where the pressure in the combustion chamber is produced by a compressor and maintained by the outflow resistance of the nozzles of a gas turbine the output of the gas turbine and auxiliary prime mover, if such latter is provided to assist the gas turbine, must always be such that it remains in equilibrium with the energy required by the compressor and any other machines such as water circulating pumps and fuel pumps which may be coupled to the compressor. This balance of power can be disturbed by a breakdown in the governing system of the auxiliary prime mover resulting in more additional power being supplied than is required over and above that delivered by the gas turbine. The balance of power can also be upset by a burst boiler tube, resulting in large quantities of steam reaching the combustion chamber and causing a rise in pressure in the chamber. In both cases the gas turbine will tend to attain excessive speeds and more especially in the latter case, because when the pressure in the combustion chamber rises, the demand on the compressor ceases and the power required by the compressor drops to a fraction of its normal value.

It is, therefore, one of the objects of the present invention to avoid any danger of the gas turbine set attaining excessive speeds. This is accomplished in accordance with the invention by opening a valve by means of a safety governor so that the heating gases are diverted from the gas turbine when its speed exceeds the maximum allowable.

Objects and advantages other than those above described will be apparent from the following description when read in connection with the accompanying drawing in which:—

Fig. 1 diagrammatically illustrates how a safety device in accordance with the invention can be applied to a pressure fired steam generator plant.

Fig. 2 illustrates in detail the valve used to by-pass the heating gases.

Referring more particularly to the drawing by characters of reference, in Fig. 1 the heating gases at a pressure only slightly lower than that prevailing in the compressor, pass from the steam generator 1 through the superheater 2 to the gas turbine 3 which drives the compressor 4. The heating gases expand in the turbine performing work and then pass to the preheater 5. In addition to the gas turbine there is also an auxiliary prime mover 6, for instance a steam turbine. This auxiliary prime mover serves mainly for starting up the steam generator and for supplying additional power when the output of the gas turbine is inadequate; it also assists the rapid acceleration of the compressor when there is a sudden increase in load on the steam generator. Superheater 2 and preheater 5 may, if desired, be omitted. The safety device comprises the by-pass device 7 which forms a direct connection between the space on the inlet side of turbine 3 and the space on the outlet side of the turbine. This by-pass device is operated by the safety governor 8 which is for instance mounted on the shaft of the auxiliary prime mover. If the maximum allowable speed is exceeded the safety governor operates and opens the valve contained in the apparatus 7. The heating gases can now flow direct as shown in Fig. 1 to the preheater. When the cross-sectional area of the heating-gas passages in the preheater are small, as is the case with pressure fired steam generators with high heating gas velocities, the heating gases leaving the turbine become slightly throttled so that the pressure drop in the gas turbine is greatly reduced and the gas turbine immediately decelerated.

When the auxiliary prime mover is fitted with a safety governor this governor can also be used to operate the valve in the device 7. This arrangement is particularly simple when oil under pressure is used to effect the governing of the auxiliary prime mover, namely when the oil pressure regulation commonly employed for steam turbines is used. The safety device can then be operated by the same oil pressure system as that which for example controls the steam valves of the auxiliary prime mover.

The oil pressure system comprises a reservoir 9, a pump 10, a by-pass valve 11 operated by the governor 8, a pressure-regulating valve 12 for example of the well-known spring controlled type, conduit 13 for conveying the pressure oil to device 7 and conduit 14 for returning oil from device 7 to reservoir 9.

Fig. 2 shows in detail the by-pass device operated by oil under pressure. The space 15 is in communication with a space on the inlet side of the gas turbine and the space 16 leads to the outlet side of the turbine. Spaces 15 and 16 are separated by the valve 17. The valve spindle also carries a piston 18 on which the oil pressure from the oil system acts. The oil enters through the pipe 13. The pressure on the piston is maintained through the small hole 19 and this latter also enables the oil losses, resulting from leakages past the piston, to be compensated. 14 designates the oil outlet pipe. During normal operation the pressure of the oil forces the piston down and the valve 17 is thus kept shut. When the allowable speed is exceeded, the safety governor opens the oil pressure system so that the pressure diminishes and the valve is raised by the action of the spring 20. In order that this action can occur quickly it is necessary to provide for a quick transfer of the oil from the top side of the piston. A piston valve 21 is provided for this purpose. When the pressure in the space 22 diminishes, the action of the spring 23 and the oil pressure still prevailing in the space between the piston 18 and restricted port 19 move the piston valve 21 upwards so that a larger outlet passage is provided for the oil which is on the top side of the piston 18. The oil then flows through the openings 24 in the valve spindle and through the outlet pipe 14.

In addition to serving as a safety device for preventing the gas turbo-compressor set from attaining excessive speeds the valve 7 can also be used as a safety device to prevent the pressure in the combustion chamber and heating tubes reaching too high a value. For this purpose the oil pressure is adjusted by means of a pressure regulating valve 12 (Fig. 1) to such a value that the piston valve 21 (Fig. 2) is moved upwards by oil pressure as soon as the oil pressure above the piston 18 produced by the upward movement of the piston, as a result of the gas pressure on the underside of the valve disc 17, exceeds a predetermined value, and oil commences to escape through the openings 24 and 14. The valve then operates as a normal safety or pressure limiting valve for maintaining the oil pressure in the control system, instead of using a dead-weight or spring-loaded valve to accomplish the same object.

It is claimed and desired to secure by Letters Patent:—

1. A safety device for pressure fired steam generator systems wherein the hot gases from the pressure fired generator pass successively through a superheater, a gas turbine connected to drive a compressor, and a preheater, which comprises a by-pass valve adapted when open to pass gas directly from the superheater to the preheater without passing through said gas turbine, and means actuated by excessive velocities of said gas turbine to open said by-pass valve.

2. A safety device for pressure fired steam generator systems wherein the hot gases from the pressure fired generator pass successively through a superheater, a gas turbine connected to drive a compressor, and a preheater, which comprises a by-pass valve adapted when open to pass gas directly from the superheater to the preheater without passing through said gas turbine, and means actuated by excessive pressures in said generator system to open said by-pass valve.

3. A safety device for pressure fired steam generator systems wherein the hot gases from the pressure fired generator pass successively through a superheater, a gas turbine connected to drive a compressor, and a preheater, which comprises a by-pass valve adapted when open to pass gas directly from the superheater to the preheater without passing through said gas turbine, an oil pressure system normally maintaining said valve in closed position and means actuated by excessive velocities of said gas turbine to release said oil pressure thereby permitting said valve to open.

4. A safety device for pressure fired steam generator systems wherein the hot gases from the pressure fired generator pass successively through a superheater, a gas turbine connected to drive a compressor, and a preheater, which comprises a by-pass valve adapted when open to pass gas directly from the superheater to the preheater without passing through said gas turbine, an oil pressure system normally maintaining said valve closed against the pressure in said generator system, and means for adjusting the pressure in said oil pressure system to a predetermined amount whereby pressures in said generator system in excess of a predetermined amount will cause said valve to open.

5. A safety device for pressure fired steam generator systems wherein the pressure in the combustion chamber is produced by a compressor and wherein the hot gases from the pressure fired generator pass through a gas turbine connected to drive said compressor, which comprises a by-pass valve adapted when open to pass gas directly from the inlet side of the gas turbine to the outlet side thereof without passing through the gas turbine and means actuated by excessive velocities of said gas turbine to open said by-pass valve.

6. A safety device for pressure fired steam generator systems wherein the pressure in the combustion chamber is produced by a compressor and wherein the hot gases from the pressure fired generator pass through a gas turbine connected to drive said compressor, which comprises a by-pass valve adapted when open to pass gas directly from the inlet side of the gas turbine to the outlet side thereof without passing through the gas turbine and means actuated by excessive gas pressures in the combustion gas system of said pressure fired generator to open said by-pass valve.

WALTER GUSTAV NOACK.